(12) United States Patent
Aiura

(10) Patent No.: US 8,283,898 B2
(45) Date of Patent: *Oct. 9, 2012

(54) BATTERY CHARGING CIRCUIT

(75) Inventor: Masami Aiura, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/780,947

(22) Filed: May 17, 2010

(65) Prior Publication Data

US 2010/0301812 A1    Dec. 2, 2010

(30) Foreign Application Priority Data

May 28, 2009 (JP) ................... 2009-129394

(51) Int. Cl.
H01M 10/46 (2006.01)
(52) U.S. Cl. ....................................... 320/160
(58) Field of Classification Search .................. 320/107, 320/114, 125, 134, 136, 160, 162
See application file for complete search history.

(56) References Cited

U.S. PATENT DOCUMENTS 4,233,553 A * 11/1980 Prince et al. ................... 320/146
4,341,988 A    7/1982 Small
4,418,310 A   11/1983 Bollinger
6,297,617 B1  10/2001 Aoyama
6,982,886 B2 *  1/2006 Fukumoto ....................... 363/72
2003/0090238 A1  5/2003 Wolin et al.
2005/0184705 A1 *  8/2005 Gawell et al. ................. 320/160
2007/0008751 A1 *  1/2007 Toda et al. ...................... 363/26
2009/0058363 A1  3/2009 Platania

FOREIGN PATENT DOCUMENTS

JP  08-237880 A   9/1996
JP  9-233707 A    9/1997
JP  10-334360 A  12/1998
JP  2007-159292 A 6/2007

* cited by examiner

Primary Examiner — Edward Tso
(74) Attorney, Agent, or Firm — Charles Bergere

(57) ABSTRACT

A battery charging circuit that stabilizes operation when switching between charge modes includes first and second transistors. The first transistor has a source connected to a first switch circuit. The first switch circuit connects the second transistor to either one of first and second external terminals. A mode switch circuit generates a switch signal for switching from a trickle charge mode to a fast charge mode. The mode switching circuit provides the switching signal to a comparison circuit. After a predetermined time elapses, the mode switching circuit provides the switching signal to the switch circuit. The comparison circuit lowers a current restriction reference voltage, which determines a charging current value, and returns the current restriction reference voltage to its original value after switching modes.

5 Claims, 6 Drawing Sheets

BATTERY CHARGING CIRCUIT

BACKGROUND OF THE INVENTION

The present invention relates to a battery charging circuit used to charge a battery.

Rechargeable batteries, such as lithium ion batteries, are often used in electronic devices. When charging such a battery with a charger, charging must be performed within a voltage range specified for the particular type of battery. A charging voltage that is less than the specified range will reduce the charge capacity of the battery. A charging voltage that is greater than the specified range will cause voltage stress to drastically decrease the charge capacity of the battery. Further, the charge current also has an upper limit. The charging voltage range for a lithium ion battery, for example, is narrow. Thus, if the input current from a charging power supply is restricted to an upper limit, the voltage is stabilized.

Japanese Laid-Open Patent Publication No. 8-237880 (page 1, FIG. 1) describes a charger in which input current from a charging power supply is stabilized by first and second current stabilization circuits, which respectively output a large current and a small current. A switching circuit first activates the first current stabilization circuit and charges a battery pack with the large current. As the battery voltage reaches a predetermined value and approaches a fully charged state, the switching circuit deactivates the first current stabilization circuit and activates the second current stabilization circuit to continue charging with a small current.

Japanese Laid-Open Patent Publication No. 9-233707 (page 1, FIG. 1) describes a charger that switches modes. In this charger, a switching circuit activates first and second current stabilization circuits and charges a battery pack with a large current. As the battery voltage reaches a predetermined value, the switching circuit deactivates the second current stabilization circuit to continue charging with just the activated first current stabilization circuit.

Referring to FIGS. 6A and 6B, a charging circuit for a lithium ion battery performs charging in two modes, namely, a trickle charge mode and a fast charge mode. The charging circuit enters a trickle charge mode when it starts charging. In the trickle charge mode, charging is performed by supplying current having a fixed and relatively small current value I1, as shown in FIG. 6B. This gradually increases the voltage of the battery.

As shown in FIG. 6A, when the voltage reaches a predetermined voltage value V1 (mode switching reference voltage), the charging circuit enters a second charging stage, namely, the fast charge mode. In the fast charge mode, charging is performed by supplying current having a fixed and relatively large current value I2.

When the voltage reaches a predetermined voltage value V2 in the fast charge mode, charging is continuously performed while maintaining the voltage value (voltage control mode). In this case, the charging current is gradually decreased. The charging ends when the charging current reaches a fixed current value I3.

A charging circuit 10 that performs such charging will now be discussed with reference to FIG. 4. The battery charging circuit 10 supplies charging current to a battery 50, which is connected to an external terminal TM1. The battery charging circuit 10 is supplied with voltage V10 via an external terminal TM2.

The external terminal TM2 is connected to the drain of an NMOS transistor 100. The source of the transistor 100 is connected to a resistor R0. Charging current is supplied to the battery 50 from the source of the transistor 100 via the external terminal TM1.

The gate of the transistor 100 is connected to the gate of another NMOS transistor 101. The drain of the transistor 101 is connected to the external terminal TM2 and supplied with the voltage V10. The transistors 100 and 101 form a current mirror circuit.

The source of the transistor 101 is connected to a switch 13. The switch 13 connects the source of the transistor 101 to either one of external terminals TM3 and TM4. A mode switching circuit 30 is connected to the switch 13. The mode switching circuit 30 measures the voltage between the two terminals of the battery 50 and provides the switch 13 with a switching signal for switching from the trickle charge mode to the fast charge mode when the voltage reaches the mode switching reference voltage.

When receiving the switching signal, the switch 13 changes connections from the external terminal TM3 to the external terminal TM4.

The external terminals TM3 and TM4 are also connected to a switch circuit 14. The switch circuit 14 is provided with the switching signal from the mode switching circuit 30 and switches connections in synchronism with the switch 13. In this manner, when provided with the switching signal, the switch 13 and switch circuit 14 each change connections from the external terminal TM3 to the external terminal TM4.

The external terminal TM3 is connected to a resistor R1, and the external terminal TM4 is connected to a resistor R2. The resistor R1 is used to determine the current value in the trickle charge mode. The resistor R2 is used to determine the current value in the fast charge mode. Generally, the charging current in the fast charge mode is set to be about twenty times greater than the charging current in the trickle charge mode. Accordingly, the resistance values of the two resistors R1 and R2 are also set to have a difference of about twenty times. Parasitic capacitances C1 and C2 are added to the resistors R1 and R2.

The switch circuit 14 has an output terminal connected to a non-inverting input terminal of an error amplifier 121. The error amplifier 121 is supplied with the voltage of the external terminal TM3 or TM4 that serves as an output voltage V14 of the switch circuit 14. Further, the error amplifier 121 has an inverting input terminal supplied with voltage V12, which serves as a current restriction reference voltage. The voltage V12 is used as a reference for restricting current. The output of the error amplifier 121 is provided to a mixer 120. The mixer 120 restricts the gate voltage supplied to the transistors 100 and 101 when the input voltage exceeds the reference value in the error amplifier 121 or an error amplifier 122.

The mixer 120 is also provided with the output of the error amplifier 122. The error amplifier 122 has an inverting input terminal supplied with voltage V13, which serves as a voltage restriction reference voltage, and a non-inverting input terminal, which is supplied with a divisional voltage produced by the resistor R0. The voltage V13 is used as a reference for restricting voltage.

The mixer 120 outputs voltage V11, which is supplied to the gates of the transistors 100 and 101.

In the battery charging circuit 10, when switching from the trickle charge mode to the fast charge mode, the connected one of the resistors R1 and R2 is changed. When the modes are switched in this manner, the current flowing through the resistor R2 is initially zero. Thus, as shown in FIG. 5A, the output voltage V14 of the switch circuit 14 temporarily falls immediately after switching from the resistor R1 to the resistor R2. To compensate for the fall in the output voltage V14, the charging current overshoots as shown in FIG. 5B. The fluctuation in the output voltage of the switch circuit 14 shown in FIG. 5A and the fluctuation in the current of FIG. 5B are enlarged with respect to the time axis and respectively shown in the graphs of FIGS. 5C and 5D. When such an overshooting occurs, the battery 50 is supplied with a charging current that exceeds the normal current value for the fast charge mode. Such a situation is not preferable for the battery 50.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

The present invention provides a battery charging circuit that stably operates in the trickle charge mode and the fast charge mode.

One aspect of the present invention is a battery charging circuit including an output transistor that supplies a battery with charging current. A control transistor includes a control terminal connected to that of the output transistor and a current input terminal connected to that of the output transistor. A first switch circuit switches connection of a current output terminal of the control transistor between a first terminal and a second terminal. The first terminal is connected to a first resistor that determines charging current in a trickle charge mode, and the second terminal is connected to a second resistor that determines charging current in a fast charge mode. A second switch circuit selectively outputs voltage from the first terminal and the second terminal. A third switch circuit lowers a current restriction reference voltage before the trickle charge mode is switched to the fast charge mode and returns the current restriction reference voltage to its original value after switching the modes. A first error amplifier compares an output of the second switch circuit and an output of the third switch circuit. A current amount determination unit determines a gate voltage of the output transistor based on an output of the first error amplifier.

Other aspects and advantages of the present invention will become apparent from the following description, taken in conjunction with the accompanying drawings, illustrating by way of example the principles of the invention.

Figure 1:
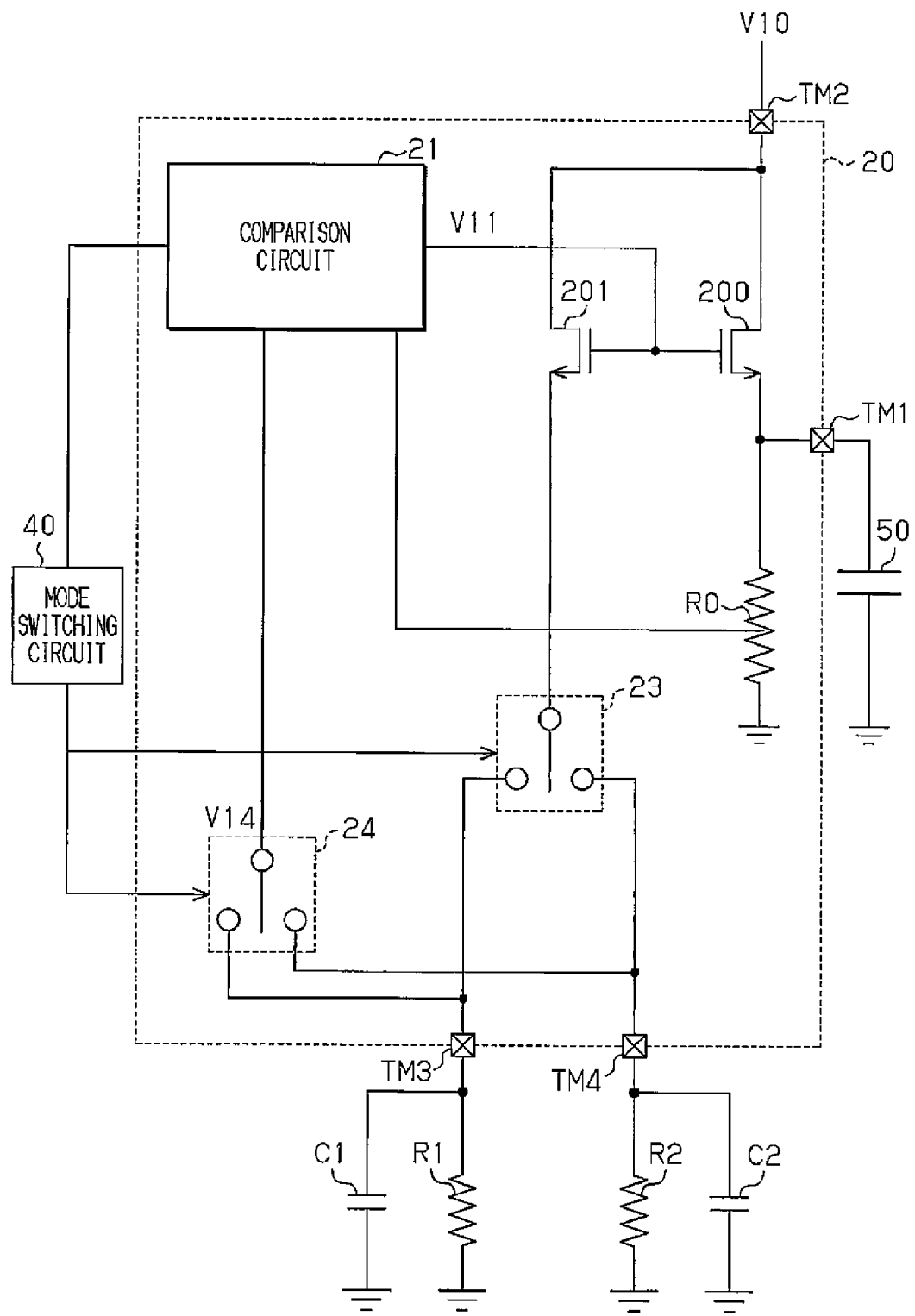
FIG. 1 is a circuit diagram of a battery charging circuit according to one embodiment of the present invention.

A battery charging circuit according to one embodiment of the present invention will now be discussed with reference to FIG. 1. The battery charger according to the present invention includes a battery charging circuit 20, a mode switching circuit 40, and resistors R1 and R2.

The battery charging circuit 20 supplies charging current to a battery 50, which is connected to an external terminal TM1. The battery charging circuit 20 is supplied with voltage V10 via an external terminal TM2.

The external terminal TM2 is connected to the drain (current input terminal) of a transistor 200, which functions as an output transistor. The transistor 200 is an N-type MOS transistor. The source (current output terminal) of the transistor 200 is connected to a resistor R0. Charging current is supplied to the battery 50 from the source of the transistor 200 via the external terminal TM1.

The gate (control terminal) of the transistor 200 is connected to the gate of a transistor 201, which functions as a control transistor. The transistor 201 is an N-type MOS transistor. The drain of the transistor 201 is connected to the external terminal TM2 and supplied with voltage V10. The transistors 200 and 201 form a current mirror circuit.

The source of the transistor 201 is connected to a switch circuit 23, which functions as a first switch circuit. The switch circuit 23 connects the source of the transistor 201 to either one of an external terminal TM3 (first terminal) and an external terminal TM4 (second terminal). A mode switching circuit 40 is connected to the switch circuit 23.

The mode switching circuit 40 measures the voltage between the two terminals of the battery 50 and generates a switching signal for switching from the trickle charge mode to the fast charge mode when the voltage reaches a mode switching reference voltage. In this case, the mode switching circuit 40 provides the switching signal to a comparison circuit 21. Then, after a predetermined delay time elapses, the mode switching circuit 40 provides the switching signal to the switch circuit 23 and a further switch circuit 24.

When provided with the switching signal, the switch circuit 23 switches its connection from the external terminal TM3 to the external terminal TM4.

The external terminals TM3 and TM4 are also connected to the switch circuit 24, which functions as a second switch circuit. The switch circuit 24 is provided with the switching signal from the mode switching circuit 40 and switches connections in synchronism with the switch circuit 23. When provided with the switching signal, the switch circuits 23 and 24 each change connections from the external terminal TM3 to the external terminal TM4.

The external terminal TM3 is connected to the resistor R1 (first resistor), and the external terminal TM4 is connected to the resistor R2 (second resistor). The resistor R1 is used to determine the current value in the trickle charge mode. The resistor R2 is used to determine the current value in the fast charge mode. The resistance values of the two resistors R1 and R2 are set to have a difference of about twenty times. Parasitic capacitances C1 and C2 are added to the resistors R1 and R2.

Figure 2:
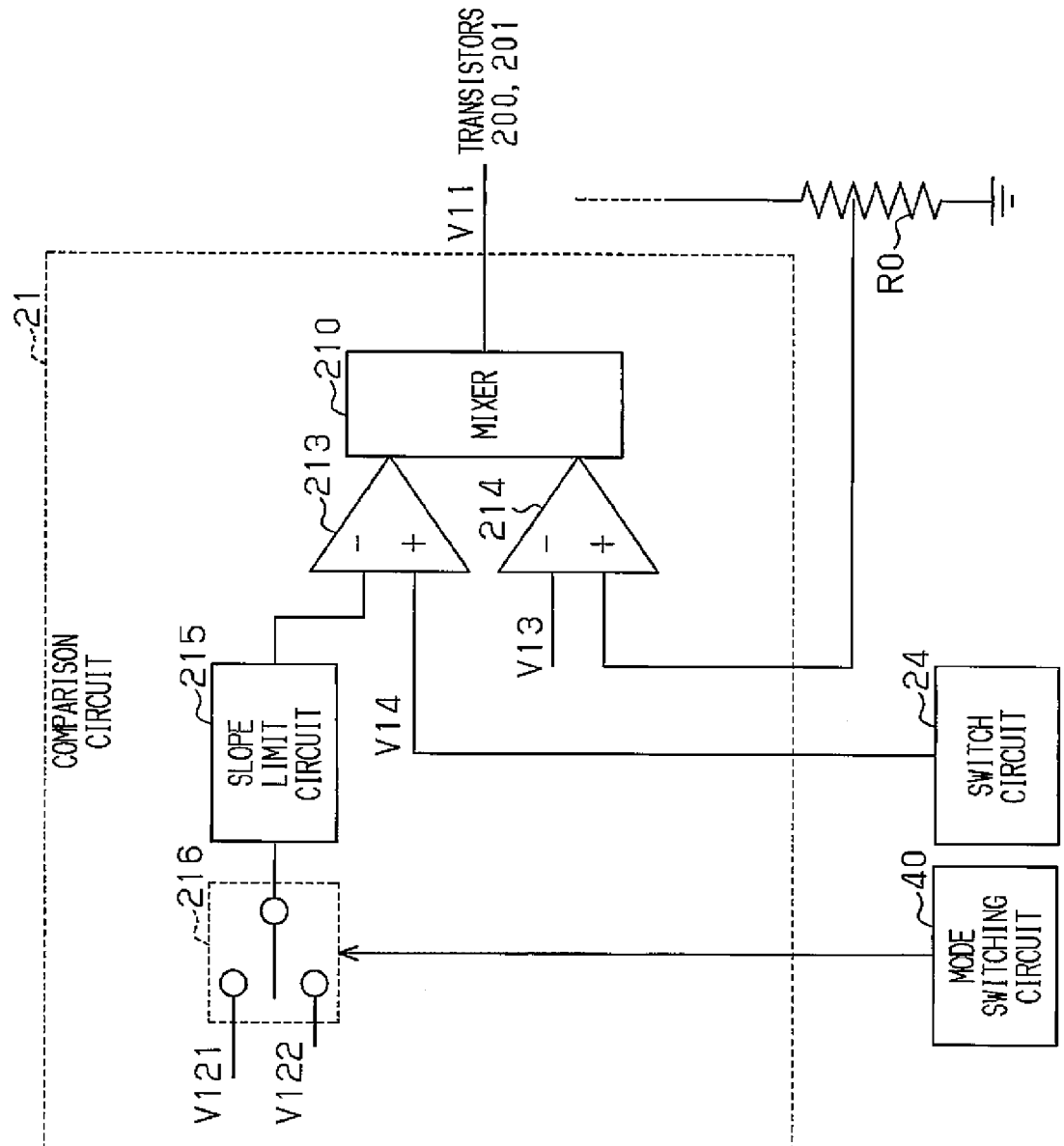
FIG. 2 is a circuit diagram of a comparison circuit in the battery charging circuit of FIG. 1.

The switch circuit 24 has an output terminal connected to the comparison circuit 21. The switch circuit 24 supplies the comparison circuit 21 with the voltage of the external terminal TM3 or TM4 as an output voltage V14. The structure of the comparison circuit 21 will now be described with reference to FIG. 2.

The comparison circuit 21 includes a switch circuit 216, which functions as a third switch circuit, a slope limit circuit

215, an error amplifier 213, which functions as a first amplifier, an error amplifier 214, which functions as a second amplifier, and a mixer 210, which functions as a current determination unit.

Based on the switching signal from the mode switching circuit 40, the switch circuit 216 switches between voltages V121 and V122. The voltages V121 and V122 are each used as a current restriction reference voltage to restrict current. The voltage V121 is used as a reference voltage for determining the value of the charging current. Voltage V122 is smaller than voltage V121. For example, the voltage V122, which is a lowered value of a current restriction reference voltage, corresponds to 75% of the voltage V121. In case overshooting occurs when switching modes, the voltage V122 is set so that the charging current does not exceed the normal value for the fast charge mode. More specifically, the voltage V122 is set so that [voltage V122]/[voltage V121] is less than [charging current value for fast charge mode]/[overshoot value]. The overshoot value refers to the charging current value when overshooting occurs.

The output of the switch circuit 216 is provided to the slope limit circuit 215.

The slope limit circuit 215 limits the voltage variation rate and adjusts the voltage rate to be less than or equal to a certain rate. The output of the slope limit circuit 215 is provided to an inverting input terminal of the error amplifier 213. The error amplifier 213 has a non-inverting input terminal supplied with the output voltage of the switch circuit 24.

The error amplifier 214 has an inverting input terminal supplied with voltage V13. Further, the error amplifier 214 has a non-inverting input terminal supplied with voltage from the resistor R0.

The outputs of the error amplifiers 213 and 214 are provided to the mixer 210. The mixer 210 restricts the gate voltage supplied to the transistors 200 and 201 in accordance with the output of the error amplifier 213 until the output of the error amplifier 214 becomes high.

Figure 3A:
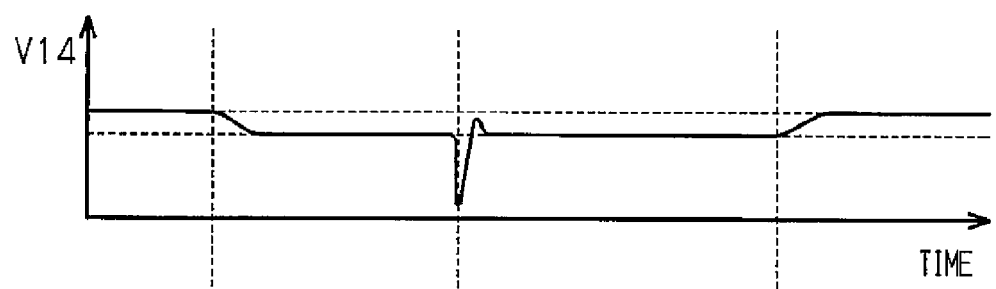
FIG. 3A is a graph showing the output voltage of a switch circuit in the battery charging circuit of FIG. 1 when switching modes.

When receiving the switching signal from the mode switching circuit 40, the comparison circuit 21 switches the voltage V121 to V122 in the switch circuit 216. In this case, the slope limit circuit 215 supplies the error amplifier 213 with the voltage V122, which is switched from the voltage V121 at a predetermined variation rate. In this case, as shown in FIG. 3A, the output voltage V14 of the switch circuit 24 decreases (time t1).

Figure 3B:
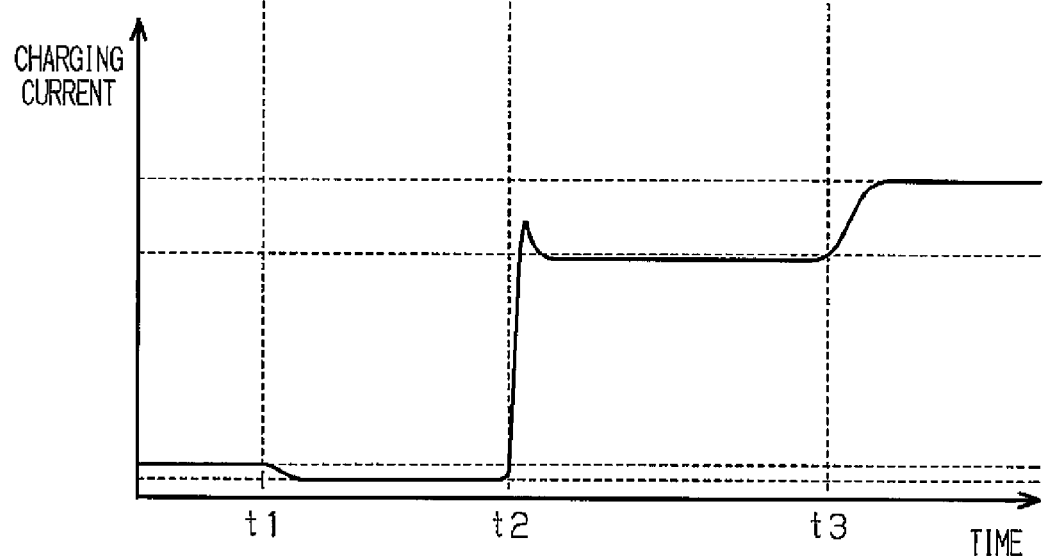
FIG. 3B is a graph showing the charging current when switching modes.
Figure 4:
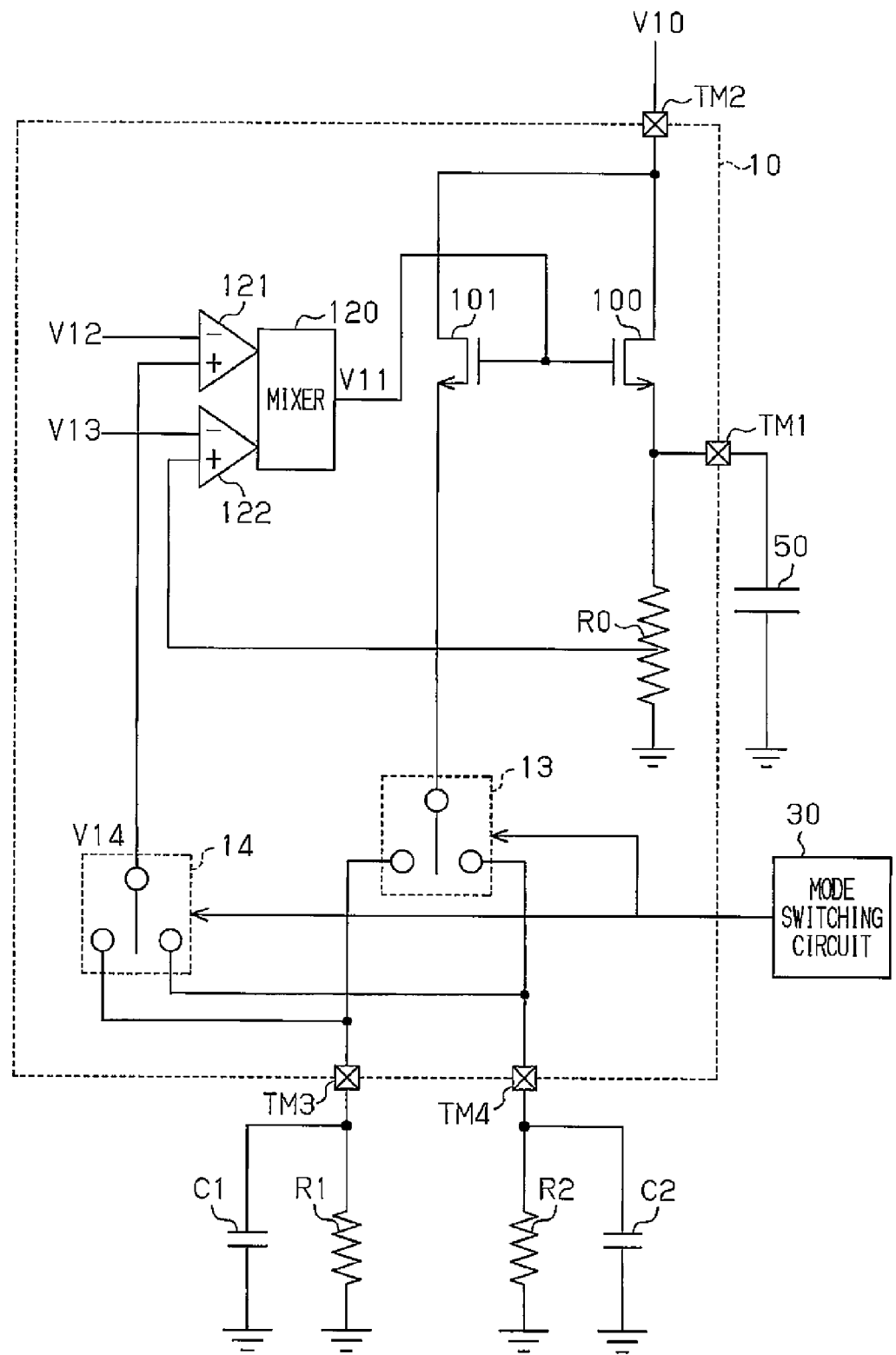
FIG. 4 is a circuit diagram of a conventional battery charging circuit.
Figure 5A:
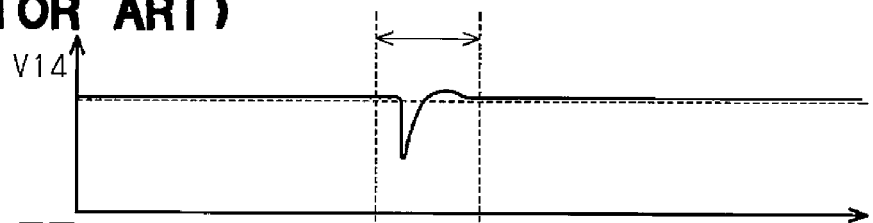
FIG. 5A is a graph showing the output voltage of a switch circuit in the conventional battery charging circuit.
Figure 5B:
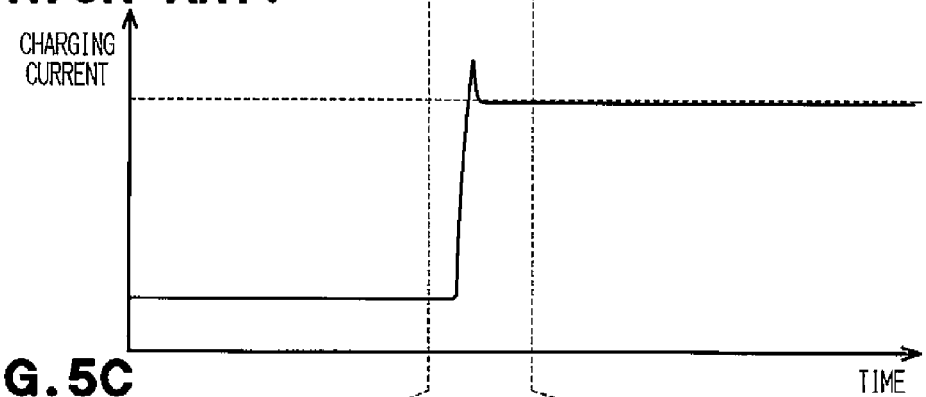
FIG. 5B is a graph showing the charging current when switching modes in the conventional battery charging circuit.
Figure 5C:
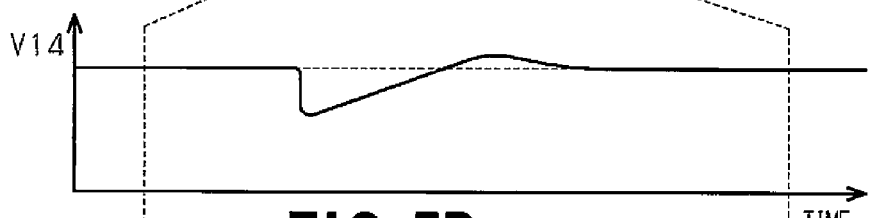
FIG. 5C is an enlarged graph of FIG. 5A.
Figure 5D:
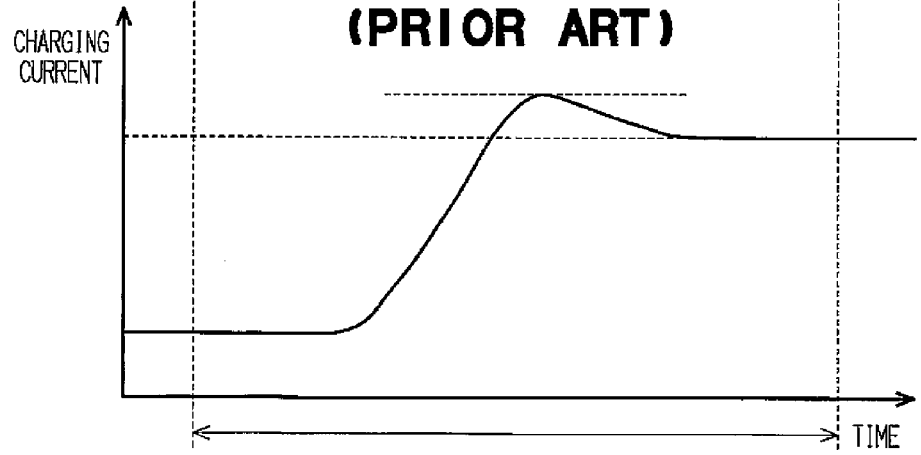
FIG. 5D is an enlarged graph of FIG. 5B.
Figure 6A:
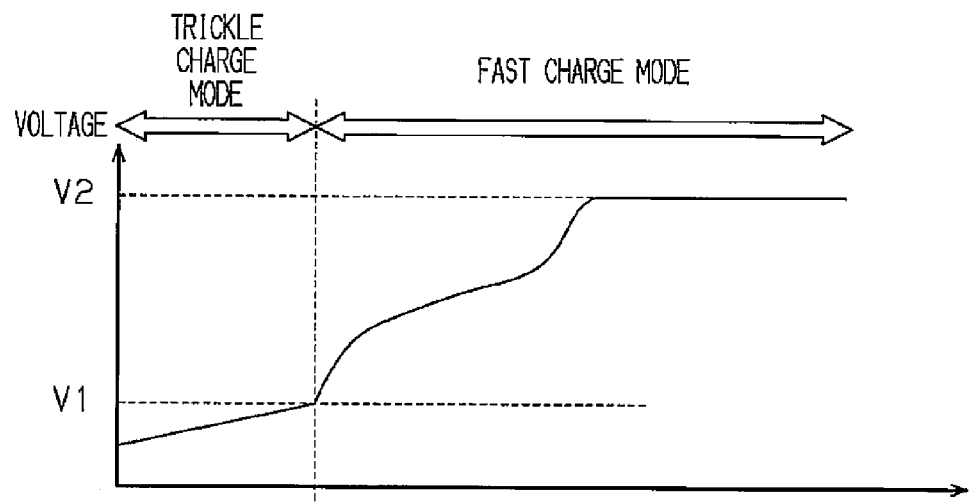
FIG. 6A is a graph showing the voltage behavior when charging a battery.
Figure 6B:
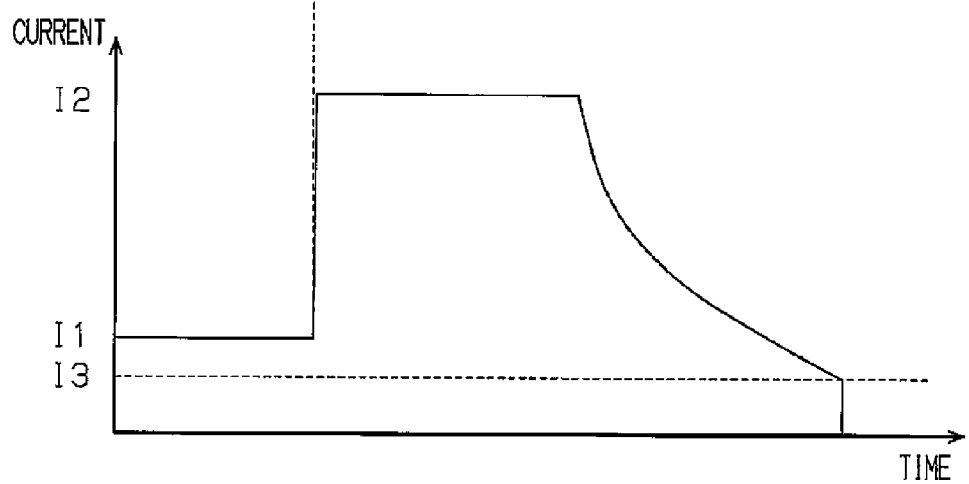
FIG. 6B is a graph showing the current behavior when charging a battery.

Then, after a delay time elapses (time t2) from when the output voltage V14 decreases by switching from the voltage V121 to the voltage V122, the mode switching circuit 40 provides the switching signal to the switch circuits 23 and 24. As a result, the output voltage V14 of the switch circuit 24 falls, and overshooting occurs (time t2), as shown in FIG. 3A. The charging current value also falls in accordance with the output voltage of the error amplifier 213. Thus, even if overshooting occurs when switching modes, the charging current does not exceed the normal value, as shown in FIG. 3B. After a predetermined time (time t3) from the switching of modes, the voltage V122 is switched back to the voltage V121. In this case, the slope limit circuit 215 gradually varies the voltage. Thus, as shown in FIG. 3A, the output voltage V14 of the switch circuit 24 gradually returns to its normal value. Consequently, as shown in FIG. 3B, the charging current returns to the normal value for the fast charge mode.

The above-described embodiment has the advantages described below.

In the above-described embodiment, the comparison circuit 21 decreases the current restriction reference voltage before switching modes to lower the charging current value. This prevents the charging current from exceeding the normal value even when overshooting occurs during mode switching. After the overshooting ends, the reference current value is returned to its original value to perform charging with current having a value that is normal for the fast charge mode.

In the above-described embodiment, the slope limit circuit 215 adjusts voltage variation to be less than or equal to a certain rate. This prevents overshooting when switching the current restriction reference voltage.

It should be apparent to those skilled in the art that the present invention may be embodied in many other specific forms without departing from the spirit or scope of the invention. Particularly, it should be understood that the present invention may be embodied in the following forms.

In the above-described embodiment, the transistors 200 and 201 are N-type MOS transistors but are not limited to such transistors. For example, P-type MOS transistors or bipolar transistors may also be used. When using a P-type MOS transistor, the source functions as the current input terminal, and the drain functions as a current output terminal. When using a bipolar transistor, the emitter terminal, the base terminal, and the collector terminal respectively function as the current input terminal, the control terminal, and the current output terminal.

In the above-described embodiment, the mode switching circuit 40 is arranged outside the battery charging circuit 20. Instead, the mode switching circuit 40 may be arranged inside the battery charging circuit 20.

In the above-described embodiment, the resistor R1 is connected to the external terminal TM3, and the resistor R2 is connected to the external terminal TM4. However, resistors for controlling the current do not necessarily have to be arranged outside the battery charging circuit 20 and may be arranged inside the battery charging circuit 20.

In the above-described embodiment, the slope limit circuit 215 may have any structure as long as it keeps the voltage variation of the switch circuit 216 constant. For example, the slope limit circuit 215 may perform CR charging and discharging or may be formed by a current source and a capacitor. Further, as long as the slope conditions are satisfied, a DA converter may be used to increase and decrease the voltage.

The present examples and embodiments are to be considered as illustrative and not restrictive, and the invention is not to be limited to the details given herein, but may be modified within the scope and equivalence of the appended claims.

What is claimed is:

1. A battery charging circuit, comprising:
   an output transistor that supplies a battery with charging current;
   a control transistor including a control terminal connected to a control terminal of the output transistor and a current input terminal connected to a current input terminal of the output transistor;
   a first switch circuit that switches connection of the current output terminal of the control transistor between a first terminal and a second terminal, the first terminal being connected to a first resistor that determines charging current in a trickle charge mode, and the second terminal being connected to a second resistor that determines charging current in a fast charge mode;
   a second switch circuit that selectively outputs voltage from the first terminal and the second terminal;
   a third switch circuit that lowers a current restriction reference voltage before the trickle charge mode is switched to the fast charge mode and returns the current restriction reference voltage to its original value after switching the modes;

a first error amplifier that compares an output of the second switch circuit and an output of the third switch circuit; and a current amount determination unit that determines a gate voltage of the output transistor based on an output of the first error amplifier.

2. The battery charging circuit of claim 1, wherein the current restriction reference voltage is lowered to a value that is determined in correspondence with an overshoot value when switching from the trickle charge mode to the fast charge mode.

3. The battery charging circuit of claim 1, wherein the switch circuit is connected to a mode switching circuit that detects voltage of the battery and outputs a switching signal when the voltage of the battery reaches a mode switching reference voltage; and the switch circuit changes connection from the first terminal to the second terminal in accordance with the switching signal.

4. The battery charging circuit of claim 1, further comprising:

a slope limit circuit that is connected to the third switch circuit and limits a voltage variation rate, wherein the output of the third switch is provided to the first error amplifier via the slope limit circuit.

5. The battery charging circuit of claim 1, further comprising:

a resistor having one end connected to a current output terminal of the output transistor and another end connected to ground; and a second error amplifier that compares a divisional voltage of the resistor with a voltage restriction reference voltage;

wherein the current amount determination unit determines the gate voltage based on the comparisons of the first and second error amplifiers.

* * * * *